(No Model.) 5 Sheets—Sheet 1.
H. A. SILVER & W. FLETCHER.
BREECH LOADING FIRE ARM.
No. 263,976. Patented Sept. 5, 1882.
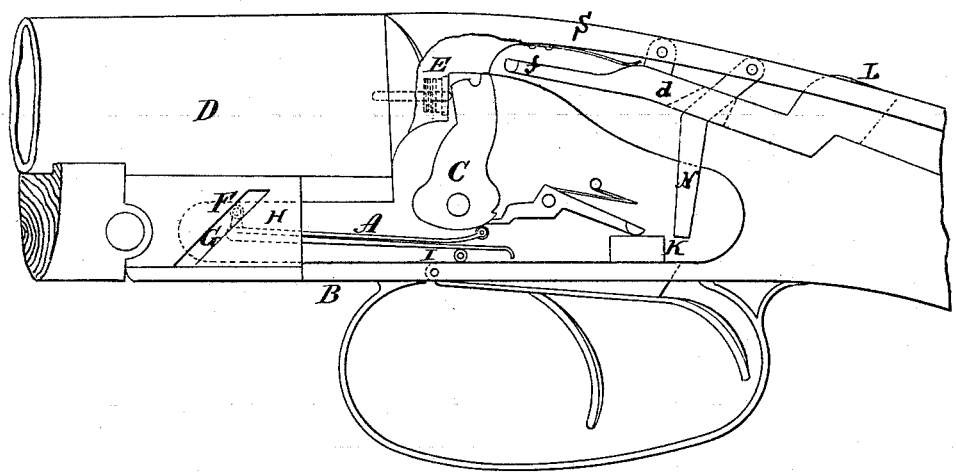
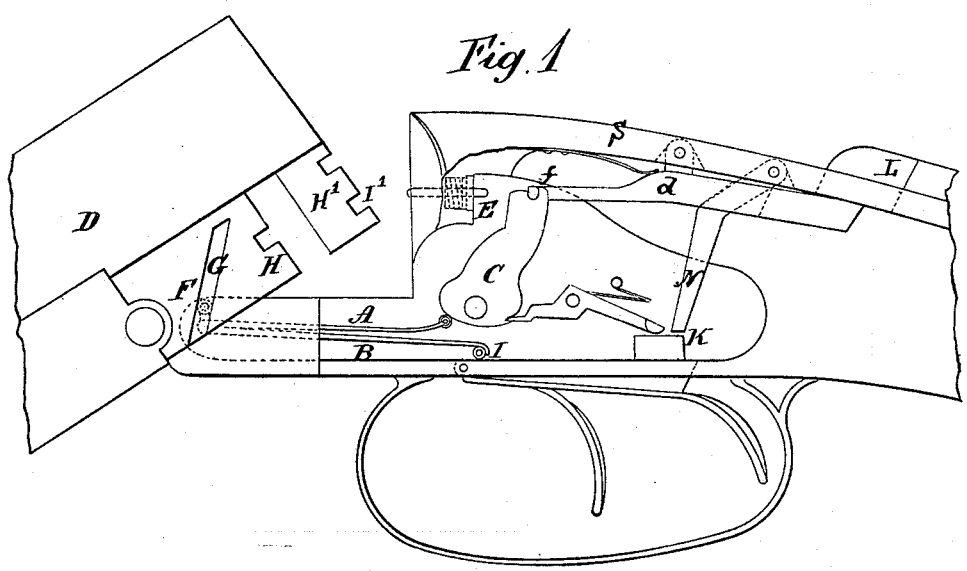

(No Model.) 5 Sheets—Sheet 2.
H. A. SILVER & W. FLETCHER.
BREECH LOADING FIRE ARM.
No. 263,976. Patented Sept. 5, 1882.
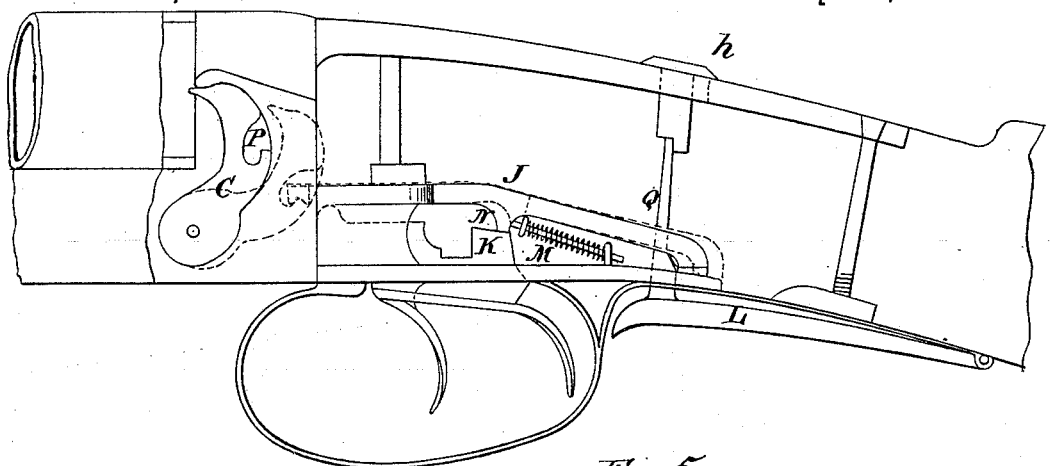
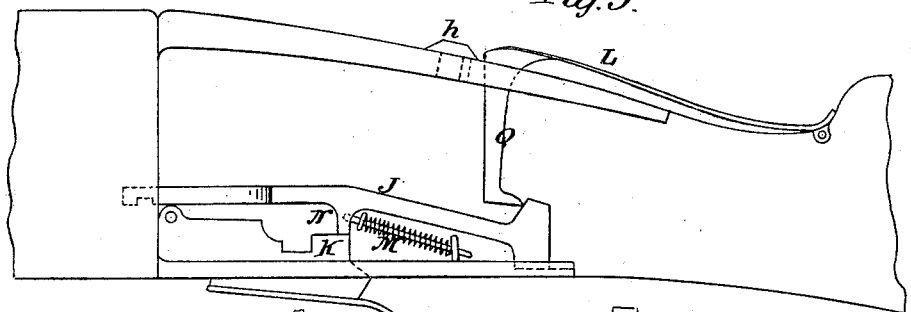
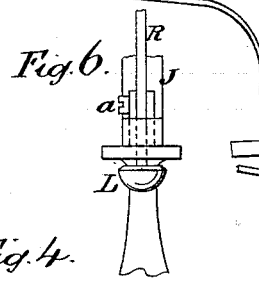
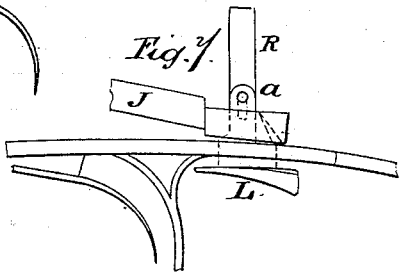
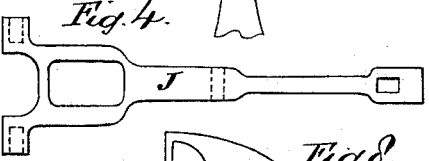
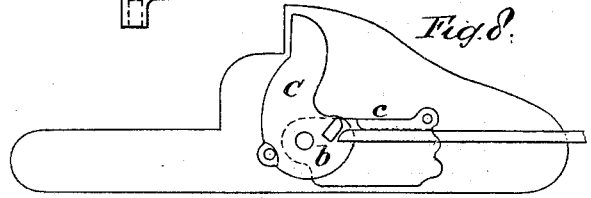
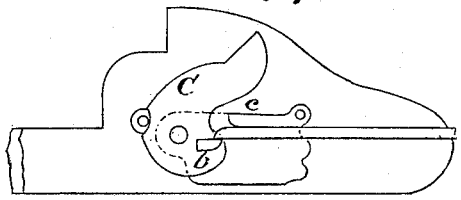
Witnesses,
J. A. Rutherford
Robert Everett
Inventors,
Hugh A. Silver.
Walter Fletcher.
By James L. Norris.
Atty.
N. PETERS. Photo-Lithographer, Washington, D. C.

(No Model.) 5 Sheets—Sheet 3.
H. A. SILVER & W. FLETCHER.
BREECH LOADING FIRE ARM.
No. 263,976. Patented Sept. 5, 1882.
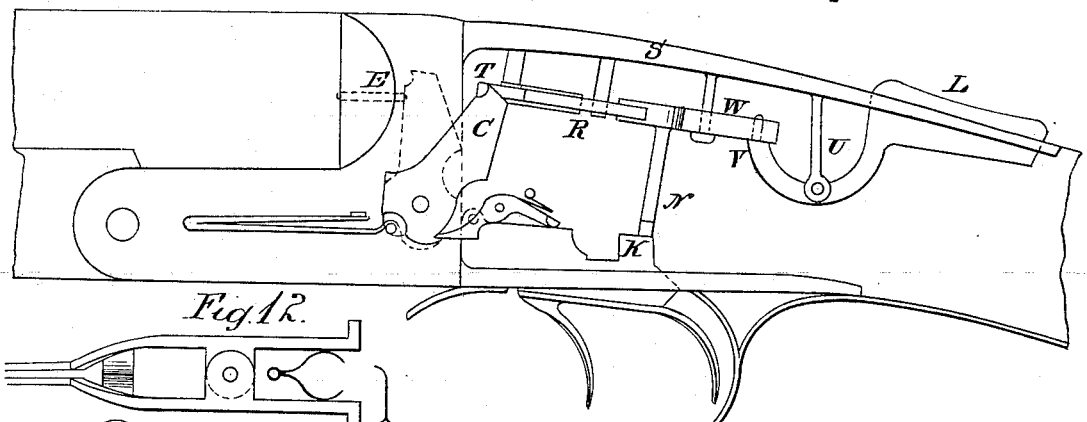
Fig. 10.
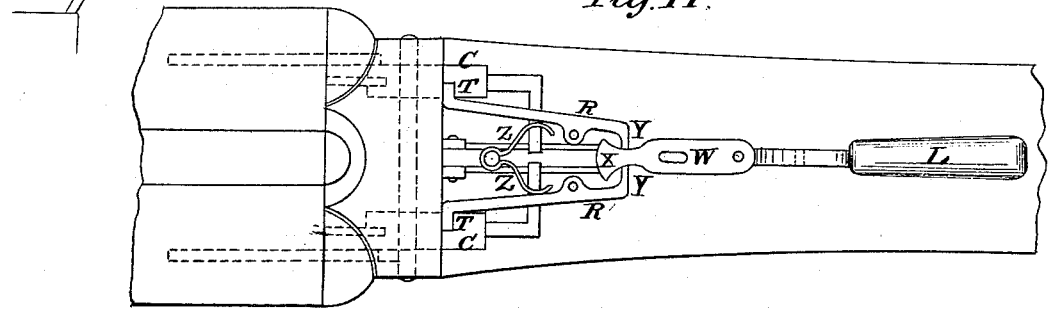
Fig. 12.
Fig. 11.
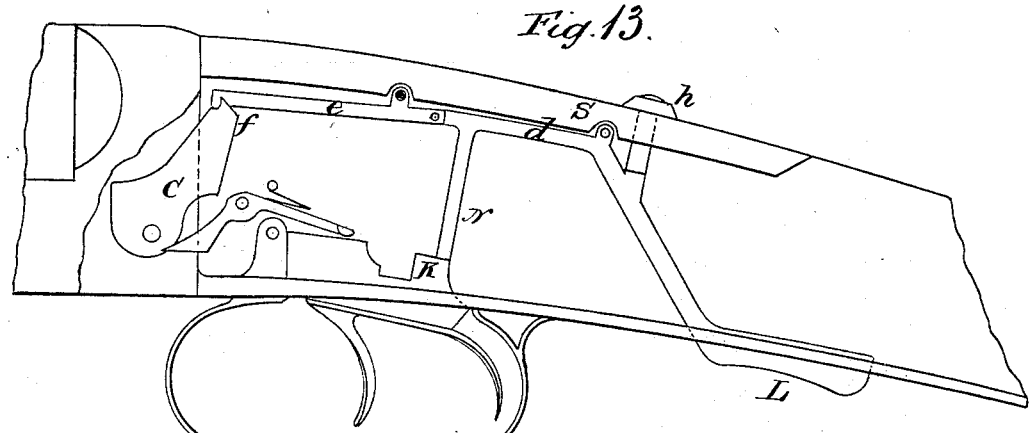
Fig. 13.
Witnesses.
J. A. Rutherford
Robert Everett
Inventors.
Hugh A. Silver
Walter Fletcher
By James L. Norris.
Atty.

(No Model.) 5 Sheets—Sheet 4.

H. A. SILVER & W. FLETCHER.
BREECH LOADING FIRE ARM.

No. 263,976. Patented Sept. 5, 1882.

Witnesses.
J. A. Rutherford
Robert Everett

Inventors.
Hugh A. Silver,
Walter Fletcher.
By James L. Norris
Atty.

(No Model.) 5 Sheets—Sheet 5.

H. A. SILVER & W. FLETCHER.
BREECH LOADING FIRE ARM.

No. 263,976. Patented Sept. 5, 1882.

Witnesses,
J. A. Rutherford
Robert Everett

Inventors,
Hugh A. Silver,
Walter Fletcher,
By James L. Norris,
Atty.

UNITED STATES PATENT OFFICE.

HUGH A. SILVER AND WALTER FLETCHER, OF LONDON, ENGLAND.

BREECH-LOADING FIRE-ARM.

SPECIFICATION forming part of Letters Patent No. 263,976, dated September 5, 1882.

Application filed June 19, 1882. (No model.) Patented in England November 7, 1881, No. 4,872; in France March 24, 1882, and in Belgium March 25, 1882, No. 57,444.

*To all whom it may concern:*

Be it known that we, HUGH ADAMS SILVER and WALTER FLETCHER, subjects of the Queen of Great Britain, residing at London, England, have invented new and useful improvements in and connected with "actions" of small-arms, (for which we have obtained patents in the following countries: Great Britain, No. 4,872, dated 7th November, 1881; France, dated 24th March, 1882; Belgium, No. 57,444, dated 25th March, 1882,) of which the following is a specification.

This invention relates to certain detail construction and arrangements of appliances in and connected with the actions of small-arms to enable the hammer or hammers or strikers to be cocked and the hammer or hammers or strikers, triggers, and safety-bolts, and in some cases the barrel or barrels also, to be locked and released.

Figure 14:
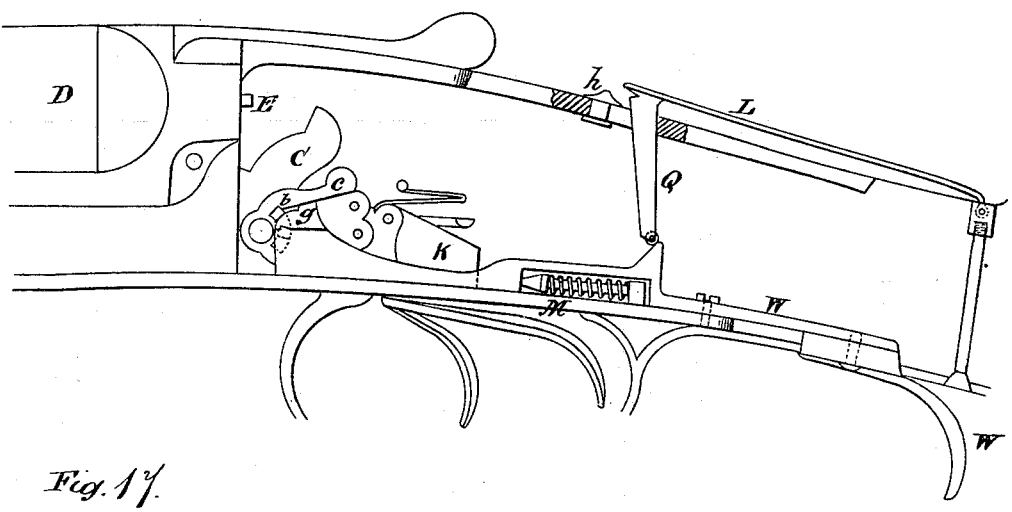
Figure 17:
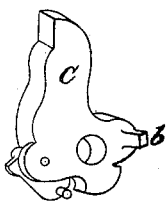
Figure 15:
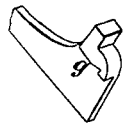
Figure 16:
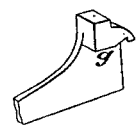
Figure 18:
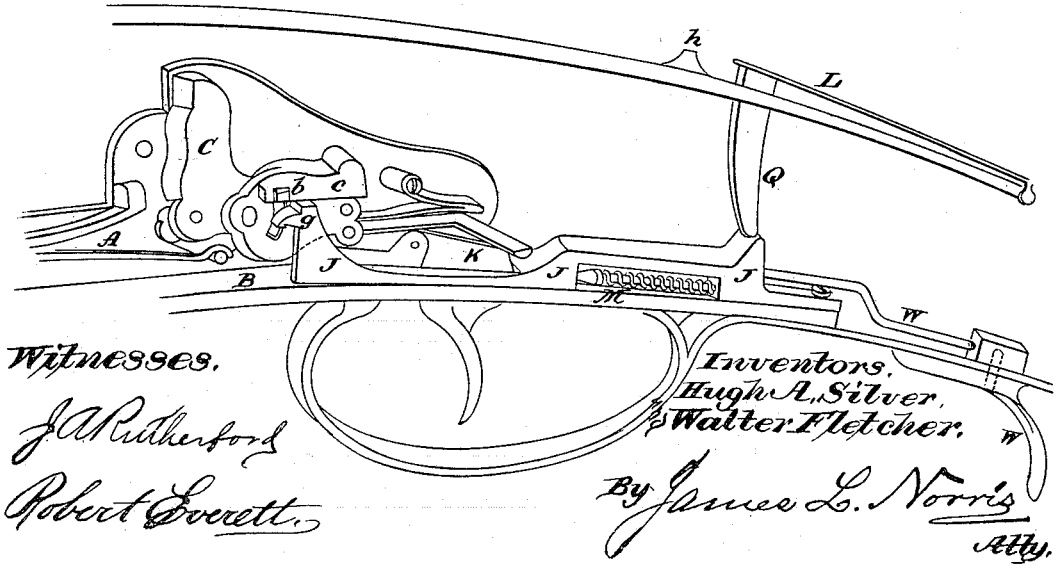
Figure 19:
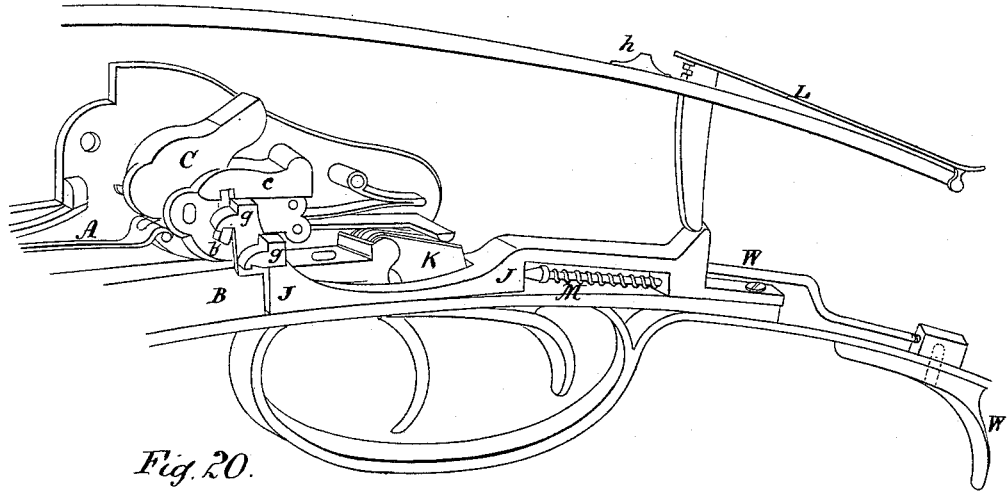
Figure 20:
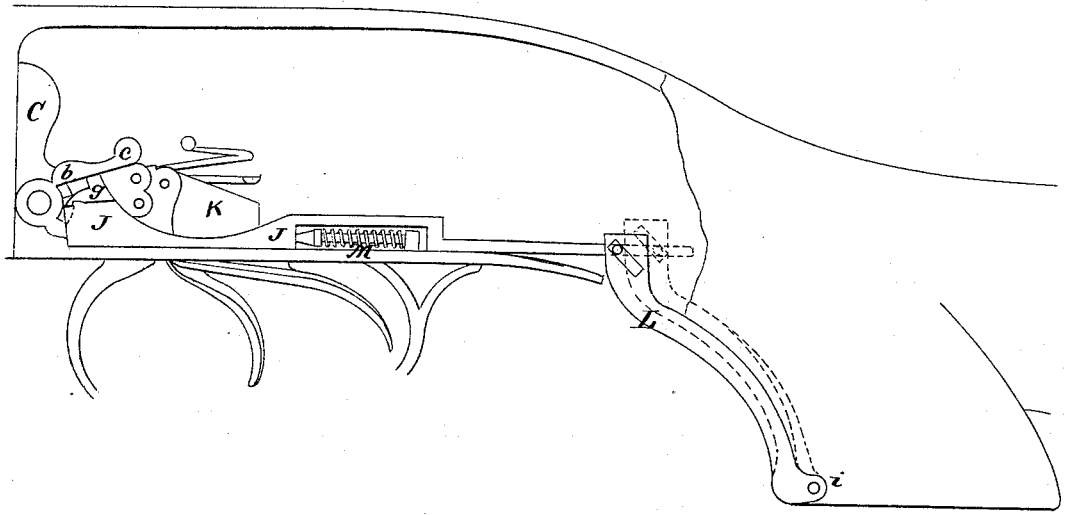

In the drawings, Figure 1 represents a side view of a portion of a gun with its action exposed. Fig. 2 is a similar view with the gun opened at the breech. Fig. 3 illustrates the devices for locking the trigger and hammer. Fig. 4 shows one form of locking-bolt. Fig. 5 illustrates a modified arrangement of the device for sliding back the locking-bolt. Figs. 6, 7, 8, and 9 are detail views, illustrating modifications of the devices for locking the hammer. Figs. 10, 11, 12, and 13 show modified construction of the means for locking the hammer. Fig. 14 represents the action of the gun with modified construction of devices for locking the hammer. Figs. 15, 16, and 17 are details of modification. Fig. 18 shows the action of the gun with the locking-bolt thrown forward, and is substantially the same as Fig. 14. Figs. 19 and 20 show the action of a modified construction with the locking-bolt in different positions.

According to the first part of our invention, which is clearly represented in the annexed drawings, we make the mainspring A, Figs. 1 and 2, that it may be fitted loosely in the lock or on the trigger-plate B, to act upon the front of the hammer C to cock it on the breech, being opened by the tilt or the forward motion of the barrel or barrels D or by a movement of the locking-bolt, and be moved to the back portion of the hammer C by a sliding motion to act upon the tail or back end for forcing it upon the nipple or upon the pin or striker E when the barrel or barrels is or are moved back again to close the breech. The movable mainspring A may be drawn to and fro by a pin or stud, F, working in a slot, G, formed in the catch or lock-piece H, under the barrel or barrels, or by an intermediate limb, and be guided by a roller, I, to reduce friction. We make the steel lump H' on the barrel or barrels deeper than usual to obtain a longer slot in same for the purpose of working our movable mainspring or otherwise, and into the additional depth of metal we form an extra notch, I', into which we introduce a second rear bolt for further securing or locking the barrels in a closed condition. We work this bolt sometimes from the action to the lump and sometimes from the "lump" into a recess in the action made to receive it. This bolt works by means of the spring already provided for it or by a spring arranged for this second rear bolt.

According to the second part of our invention, which is illustrated at Fig. 3, we fit a sliding bolt, J, in the action just above the trigger or triggers K, that it—*i. e.*, the bolt—may be forced back clear of them on the plate L being pushed in in gripping the small portion of the stock and be returned by a spiral or other spring, M, on the pressure being removed. The bolt J has a lip-piece, N, to bear upon the tops of the triggers K, and its front end, for a double-barreled arm, is forked, as shown at Fig. 4, to engage in a recess, P, in each of the hammers C, and in the action, when at full-cock, as a second safeguard against an accidental discharge. The plate L may project through from the under side, Fig. 3, or at the top, as at Fig. 5, or from the side or sides. A leg, Q, of the plate L has an inclined plane working in the sliding bolt J to push back the bolt upon pressure being put upon the plate L.

By the modification shown at Figs. 6 and 7 we suspend the plate L by the leg R and pin *a*, on which it can rise on pressure being applied to the plate L, which rising action causes the inclined faces shown by dotted lines to rub against each other and the bolt J to be pushed backward, the spring M, Figs. 3 and 5, returning the sliding bolt J and causing the plate L to fall on pressure from the plate being removed.

The sliding bolt J, according to Figs. 8 and 9, may be pushed backward by an inclined-faced projection, b, on the hammer C while being cocked, and then to shoot forward under the action of its spring to occupy a position over the projection b, between which and a strip, c, it becomes fixed until released by a pull-back action from the plate L.

According to the third part of our invention, as clearly shown at Fig. 10, we fit a pair of levers, R R, under and to the breech-strap, (or to the trigger-plate.) Each of the levers has a projection, T, (see Fig. 11,) at right angles to engage across the path of the nose of each or into recesses or holes in the side of the hammer or hammers C to prevent either of them falling upon the pin or the striker E, except when they are moved away by a depression of the plate L, caused by gripping the arm. This plate L is hinged to a projection, U, of the strap S, (or of the guard,) and has a bent-up end, V, the top of which is fitted loosely in an aperture of a pull-back strip, W, whose forward end, X, has two inclined surfaces, which act upon the tail ends Y Y of the two above-mentioned levers R R when drawn back to throw the tail-ends apart and the opposite ends toward each other, a spring, Z, being fitted between them for producing the reverse action when the pressure is removed. In the backward movement a leg, N, resting on the triggers K, is removed to free the triggers for firing. Instead of a bent-up end, we may use two inclined planes at the rear ends of the levers to open or close the levers clear of the hammers, tumblers, or strikers. The rear end is so formed to rest over the triggers, and closing or opening the levers frees the triggers also. The two ends of the pairs of levers R R may be arranged to come over the triggers K and be opened to clear them by two inclined or wedge-shaped ends of a pressure bolt or plate, L, as at Fig. 12.

According to the next part of our invention (shown at Fig. 13) a leg, d, of the plate L is hinged to the strap S or to the guard B, and to the front end we pin another plate, e, also pinned to the strap S, so that it may rock upon the same. The front end of this second plate, e, is provided with a claw, f, for the top ends of the strikers or hammers C to engage in to hold them in safety. The leg d of the depression-plate L has an arm, N, depending from it to rest upon the tops of the triggers K to hold them secure. The leg N may be fixed or it may be movable.

In Fig. 14 we have shown a pull-back lever, W, in the same arm as the depression-lever L, so that either of them or both can be used to draw back the bolt J, which in this arrangement has a nose-piece, g, at its front end (see Figs. 15 and 16) to engage under a lug or projection, b, Fig. 15, on the hammer C, Fig. 17, when the arm has been discharged, the lug then being in position to press upon the rounded portion of the nose-piece g (see Fig. 18) to push the bolt J back automatically when the hammer C is being cocked, as will be clearly understood by reference to Figs. 18 and 19, one view of which shows the bolt in a single-barreled gun and the other with two nose-pieces on the same bolt for a double-barreled gun. The under surface of the nose-piece has a nick in it, into which the hammer projection b engages when the hammer is at full-cock, (see Fig. 16,) to prevent the hammer moving far from its cocked position except when the bolt J is drawn back. The gun by this arrangement may be carried at full-cock with absolute safety through hedges and brushwood. The nose-piece for each hammer rides under a lip of the bridle to insure its parallel action.

Fig. 20 shows how the bolt J is actuated by the lever L, primed or pivoted at i to a pistol-shaped stock.

To hold the arm at full-cock, such as is necessary for rapid firing and for pigeon-guns, we fit a slide, h, in front or in rear of the depression-plate L to fix it when down.

The bolt used in the second part of our invention may, in addition to fastening triggers and hammers, also secure the sears by resting over them, as over the triggers.

Heretofore a sliding spring has been connected with the tilting barrel of a breech-loader through the medium of a link pivoted to the spring and to the barrel; but such is not claimed by us.

Having fully described our invention, what we desire to claim and secure by Letters Patent is—

1. The combination of the hammer C with the sliding spring A, acting directly upon the said hammer, and connected with the lock-piece under the tilting gun barrel or barrels by means of a pin on the spring which is received in an inclined slot in the lock-piece, substantially as described.

2. The combination, with the hammer C and trigger K, of the longitudinally-sliding bolt J, having intermediate its ends the depending lip-piece N to rest on the trigger, and at its rear end an incline, the movable plate L having a projection to operate on the inclined rear portion of the sliding bolt to move the latter rearward, and a spring, M, to move the bolt forward, substantially as described.

3. The combination, with the hammer provided with a notch, P, of the sliding bolt J, forked at its forward end, which is adapted to engage the hammer when the latter is cocked, the plate L, provided with a leg, Q, engaging the bolt, and the spring M, for throwing the bolt forward, substantially as described.

In witness whereof we have hereunto signed our names in the presence of two subscribing witnesses.

HUGH A. SILVER.
WALTER FLETCHER.

Witnesses:
C. GROSSETETE,
M. PERSONS.